(12) United States Patent  
Lev et al.

(10) Patent No.: US 7,548,428 B2
(45) Date of Patent: Jun. 16, 2009

(54) COMPUTER DEVICE HEAT DISSIPATION SYSTEM

(75) Inventors: Jeffrey A. Lev, Cypress, TX (US); Mark S. Tracy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 11/881,538

(22) Filed: Jul. 27, 2007

(65) Prior Publication Data

US 2009/0027850 A1 Jan. 29, 2009

(51) Int. Cl.
 *H05K 7/20* (2006.01)
(52) U.S. Cl. ............... 361/700; 361/695; 361/697; 361/699; 257/715; 174/15.2; 174/16.1; 174/16.3; 165/80.4; 165/104.26; 165/185
(58) Field of Classification Search .......... None
See application file for complete search history.

(56) References Cited

U.S. PATENT DOCUMENTS

| 4,860,822 | A | | 8/1989 | Sacks | |
|---|---|---|---|---|---|
| 5,009,263 | A | * | 4/1991 | Seshimo et al. | 165/151 |
| 5,168,923 | A | | 12/1992 | Sacks | |
| 5,375,655 | A | * | 12/1994 | Lee | 165/185 |
| 5,409,055 | A | * | 4/1995 | Tanaka et al. | 165/104.33 |
| 5,625,229 | A | * | 4/1997 | Kojima et al. | 257/712 |
| 5,653,284 | A | | 8/1997 | Giammaruti et al. | |
| 5,701,951 | A | * | 12/1997 | Jean | 165/121 |
| 6,230,789 | B1 | * | 5/2001 | Pei et al. | 165/80.3 |
| 6,288,895 | B1 | | 9/2001 | Bhatia | |
| 6,296,048 | B1 | * | 10/2001 | Sauer | 165/80.3 |
| 6,328,097 | B1 | | 12/2001 | Bookhardt et al. | |
| 6,374,905 | B1 | * | 4/2002 | Tantoush | 165/80.3 |
| 6,439,299 | B1 | * | 8/2002 | Miyahara et al. | 165/121 |
| 6,538,885 | B1 | * | 3/2003 | Azar | 361/695 |
| 6,538,892 | B2 | | 3/2003 | Smalc | |
| 6,666,260 | B2 | * | 12/2003 | Tantoush | 165/80.3 |
| 6,826,050 | B2 | * | 11/2004 | Suzuki | 361/703 |
| 6,968,891 | B2 | * | 11/2005 | Tochigi et al. | 165/152 |
| 7,124,813 | B2 | | 10/2006 | Kester | |
| 7,303,002 | B2 | * | 12/2007 | Usui et al. | 165/109.1 |
| 7,369,410 | B2 | * | 5/2008 | Chen et al. | 361/701 |
| 2002/0109970 | A1 | * | 8/2002 | Yang et al. | 361/695 |
| 2002/0131238 | A1 | | 9/2002 | Fisher et al. | |
| 2003/0159806 | A1 | | 8/2003 | Sehmbey et al. | |
| 2004/0109289 | A1 | | 6/2004 | Lin | |

FOREIGN PATENT DOCUMENTS

JP 2002-299871 10/2002

* cited by examiner

*Primary Examiner*—Boris L Chervinsky

(57) ABSTRACT

A computer device heat dissipation system comprising a heat exchanger having a plurality of fins connected to a heat pipe, at least one of the plurality of fins comprises at least one aperture to enable an airflow to pass therethrough.

20 Claims, 5 Drawing Sheets

COMPUTER DEVICE HEAT DISSIPATION SYSTEM

BACKGROUND

Different components in an computer device generate thermal energy during operations. Damage and/or reduced operating life of the overall computer device and/or the components themselves occur if the thermal energy is not adequately dissipated. However, space limitations within the computer device, particularly a portable computer device, limit the amount and type of heat dissipation systems which can be implemented in a computer device.

DETAILED DESCRIPTION OF THE DRAWINGS

Figure 1:
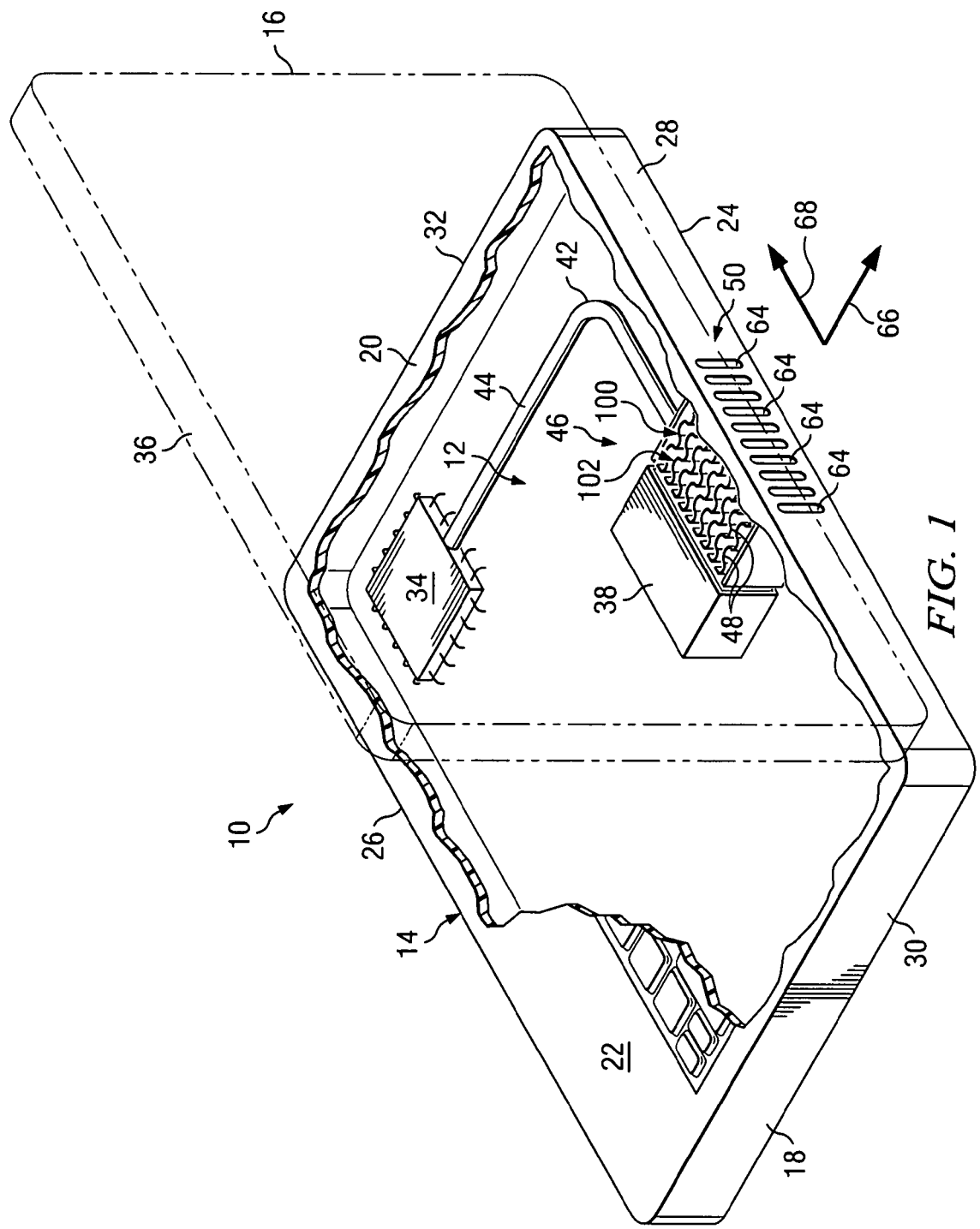
FIG. 1 is a perspective view of an interior area of a computer device in which an embodiment of a heat dissipation system is employed to advantage.

FIG. 1 is a perspective view of an interior area of a computer device 10 in which an embodiment of a heat dissipation system 12 is employed to advantage. Computer device 10 comprises a notebook or laptop computer device 14 having a display member 16 rotatably coupled to a base member 18. However, it should be understood that computer device 10 may comprise any type of device, such as, but not limited to, a desktop computer, a tablet personal computer, a convertible portable computer, a personal digital assistant, a gaming device, or any other type of portable or non-portable computer device. In the illustrated embodiment, base member 18 comprises a housing 20 having a working surface 22, a bottom wall 24, a front wall 26, a rear wall 28 and a pair of side walls 30 and 32.

In the illustrated embodiment, heat dissipation system 12 is disposed within housing 20 of base member 18 and is configured to dissipate and/or otherwise remove thermal energy from housing 20 generated by one or more computer operational components (e.g., operational component 34) disposed in base member 18. However, it should be understood that heat dissipation system 12 may be otherwise located within device 10 (e.g., within a housing 36 of display member 16) and/or may be used to dissipate thermal energy generated from elsewhere in device 10 (e.g., from operational components disposed within display member 16). Computer operational component 34 may comprise a variety of different types of operational components of computer device 10 that may generate thermal loads (e.g., a processor, graphics chip, battery, disk drive, optical drive or any other device used in operation of computer device 10).

In the illustrated embodiment, heat dissipation system 12 comprises a fan 38, a heat exchanger 46, and a heat transport element 42 thermally coupling computer operational component 34 to heat exchanger 46. In the illustrated embodiment, fan 38 is configured to enable an airflow to flow through heat exchanger 46 (e.g., across the surfaces of fins 48 of heat exchanger 46). Heat transport element 42 may comprise any type of thermally conductive element capable of transferring heat from operational component 34 to heat exchanger 46. In the illustrated embodiment, heat transport element 42 comprises a heat pipe 44 preferably filled with a vaporizable liquid to increase heat transfer performance. In the illustrated embodiment, heat exchanger 46 is aligned with and/or otherwise positioned near a housing outlet 50 to facilitate an airflow across and/or through heat exchanger 46 and discharge thereof through housing outlet 50.

In the illustrated embodiment, heat exchanger 46 comprises a plurality of non-planar fins 48 which are exposed to the airflow generated by fan 38 in a manner that dissipates thermal energy received at fins 48 from heat pipe 44. In general, embodiments of heat dissipation system 12 extend and/or increase the surface area to which the airflow contacts fins 48, thereby resulting in a greater rate of heat transfer and/or increased convection (e.g., dissipation of thermal energy) away from computer device 10. Embodiments of fins 48 comprise a non-planar configuration 100 and, in the illustrative embodiment, non-planar configuration 100 is a sinusoidal wave configuration 102. However, it should be noted that non-planar configuration 100 can be any pattern and/or shape (e.g., a saw tooth configuration, a square wave configuration, a circular configuration, a linear configuration, any combination thereof, etc.). Moreover, it should be noted that non-planar configuration 100 may be non-uniform with portions of each fin 100 having different pattern configurations 100 (e.g., a portion of each fin 100 may comprise a linear and/or planar portion, etc.). Furthermore, in the illustrated embodiment, fins 48 are disposed and/or oriented generally in direction 66 thereby enabling airflow 58 to follow the configuration of fins 48 in direction 66. However, in alternative embodiment, fins 48 can be oriented at any angle relative to airflow 58 (e.g., direction 68, any angle between direction 66 and direction 68, etc.). Thus, in some embodiments of operation, cooling air is drawn into housing 20 by fan 38 (e.g., through at least one housing inlet) and forces an airflow across heat exchanger 46, thereby dissipating thermal energy transferred from operational component 34 to heat exchanger 46 by heat pipe 44.

Figure 2:
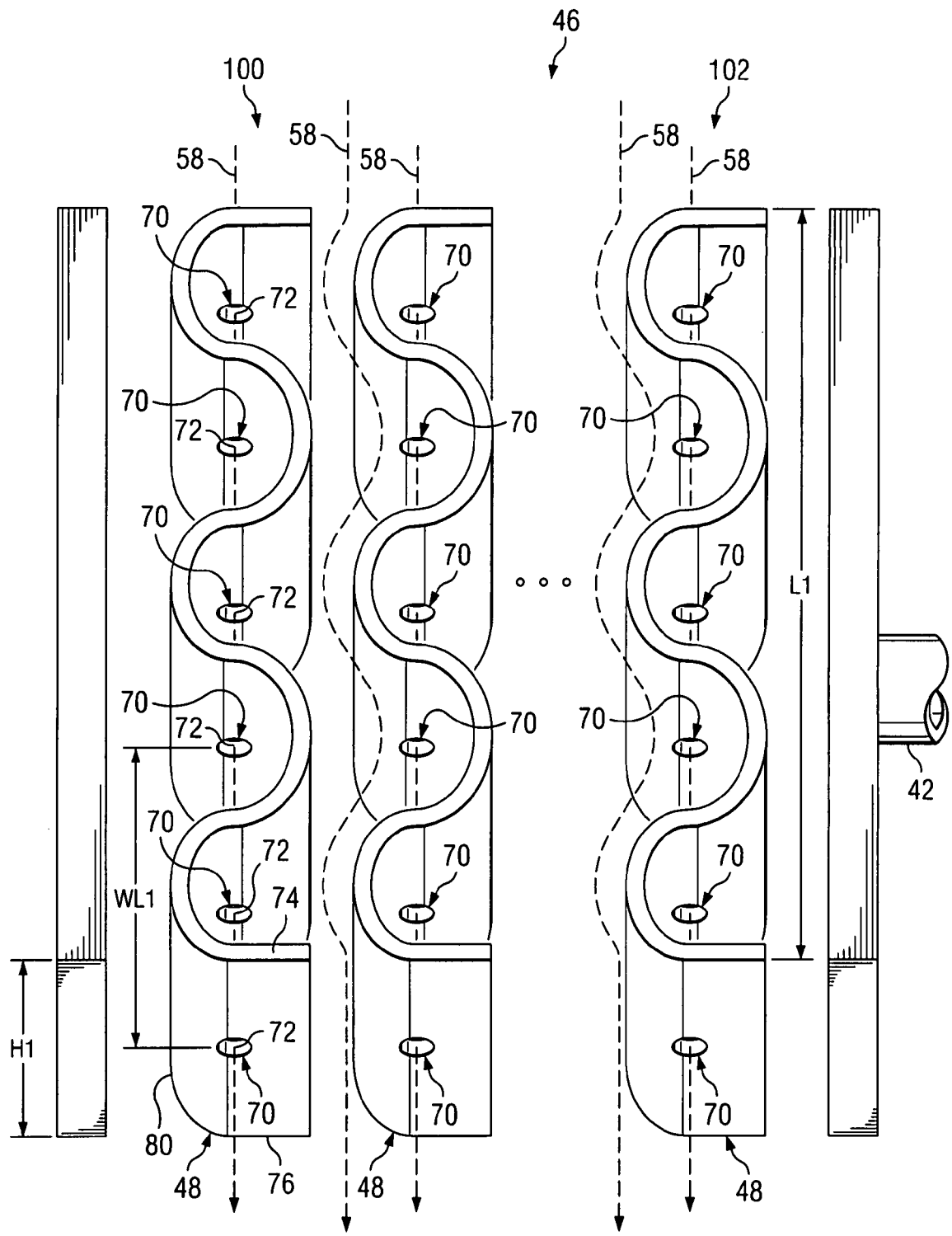
FIG. 2 is a perspective view of a heat exchanger of the heat dissipation system in FIG. 1.

FIG. 2 is a perspective view of heat exchanger 46 of heat dissipation system 12 in FIG. 1. In the illustrated embodiment, heat exchanger 46 comprises a plurality of sinusoidal wave configured fins 48. However, in alternative embodiments, it should be understood that heat exchanger 46 may comprise fins 48 having different non-planar configurations 100 and/or mixed with another non-planar configuration. In the illustrated embodiment, fins 48 comprise a substantially uniform, evenly distributed sinusoidal wave configuration 102. In the illustrated embodiment, each fin 48 comprises at least one aperture 70 extending through at least a portion thereof and aligned substantially along a length L1 for each fin 48. Aperture(s) 70 are configured to reduce and/or abate noise associated with an airflow 58 flowing across and/or adjacent fins 48. In the illustrated embodiment, each half-wavelength of a wavelength WL1 of each fin 48 comprises one aperture 70 disposed generally in the center or medial location of a height H1 of each fin 48. In alternative embodiments, aperture(s) 70 may be disposed within each half-wavelength of wavelength WL1, and aperture(s) 70 may be disposed in a different position at different heights relative to height H1 (e.g., a top portion 74, a bottom portion 76, a side portion 80, etc.). It should be noted, however, that aperture(s) 70 is not limited to a particular size and/or shape and may comprise a variety of alternative sizes and/or shapes that abate noise associated with airflow 58 flowing across and/or adjacent fins 48. Further, the position and/or location of aperture(s) 70 may be otherwise varied on a particular fin 48 (e.g., closer to the top and/or bottom of fin 48) and/or may be varied on one or more fins along the direction of airflow 58 (e.g., close to the bottom of fin 48 near fan 38 and gradually being moved directionally upward on fin 48 as fin 48 reaches an outlet vent (e.g., outlet 50).

Figure 3:
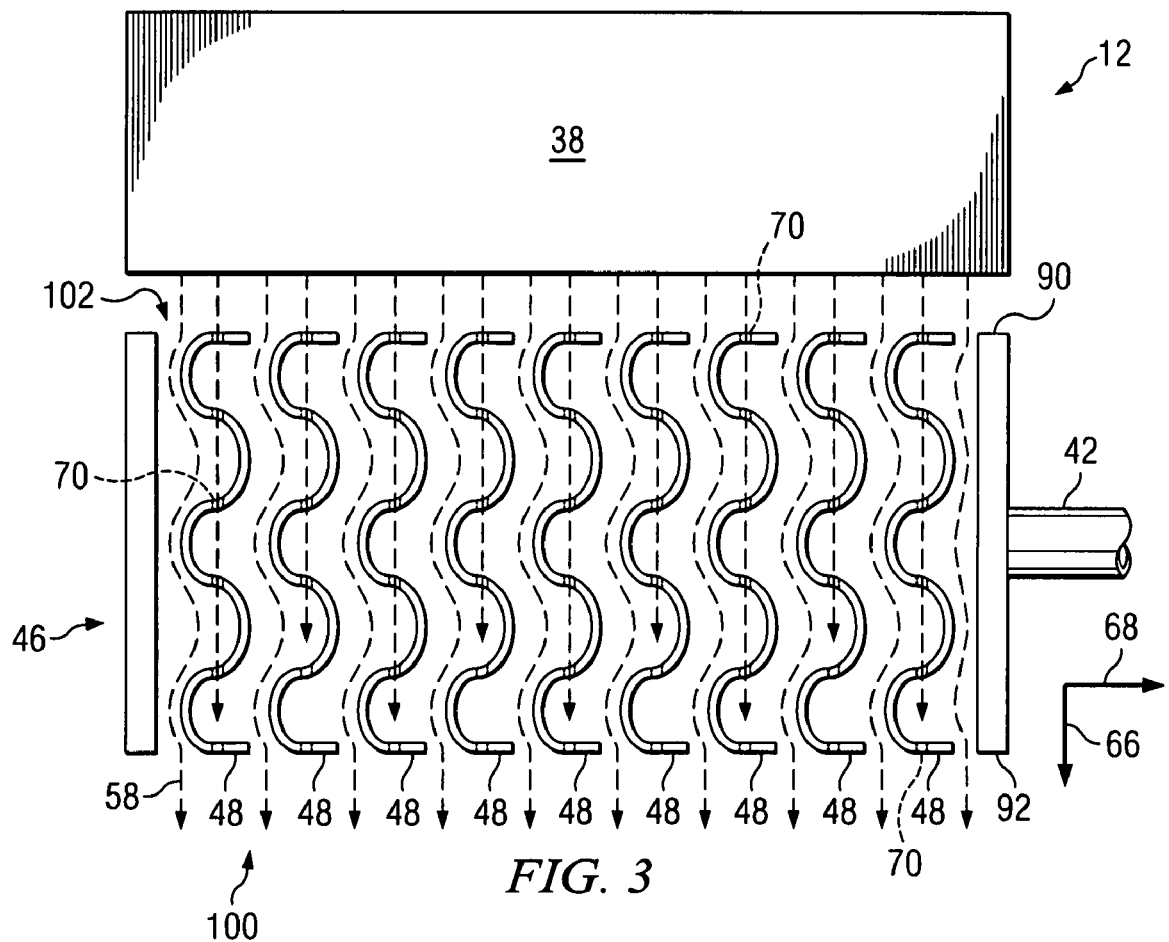
FIG. 3 is a top plan view of the heat dissipation system illustrated in FIG. 2.

FIG. 3 is a top plan view of heat dissipation system 12 illustrated in FIG. 2. In the illustrated embodiment, heat dissipation system 12 comprises fan 38 pushing airflow 58 through plurality of fins 48 of heat exchanger 46 having a sinusoidal wave configuration 102. In the illustrative embodiment, fins 48 are configured to provide increased surface area for airflow 58 to contact. Thus, in operation, airflow 58 follows sinusoidal wave configuration 102 of fins 48 as airflow 58 travels from front surface 90 to back surface 92 with fins 48 (e.g., airflow 58 travels generally in sinusoidal wave configuration 102 between fins 48, and travels generally in direction 66 when traveling through apertures 70 (FIG. 2) for each fin 48).

Figure 4A:
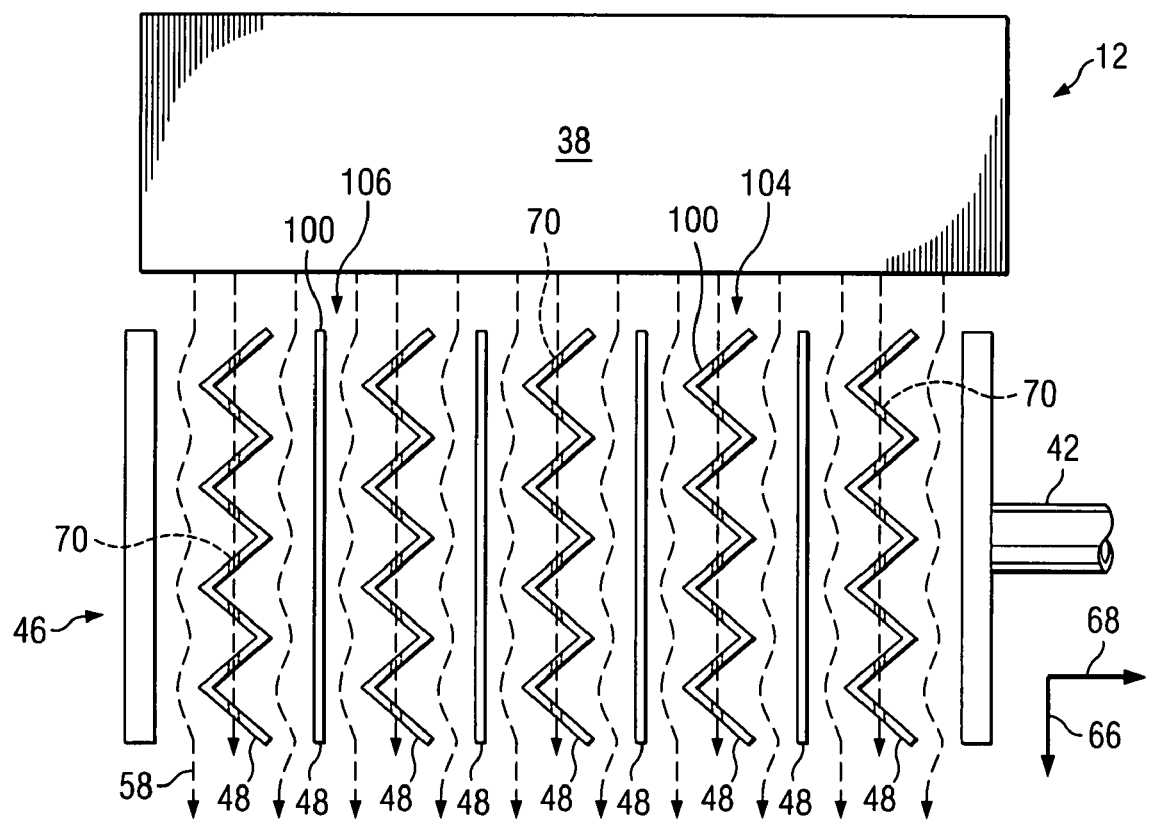
FIGS. 4A and 4B illustrate top plan views of embodiments of a heat dissipation system for a computer device.
Figure 4B:
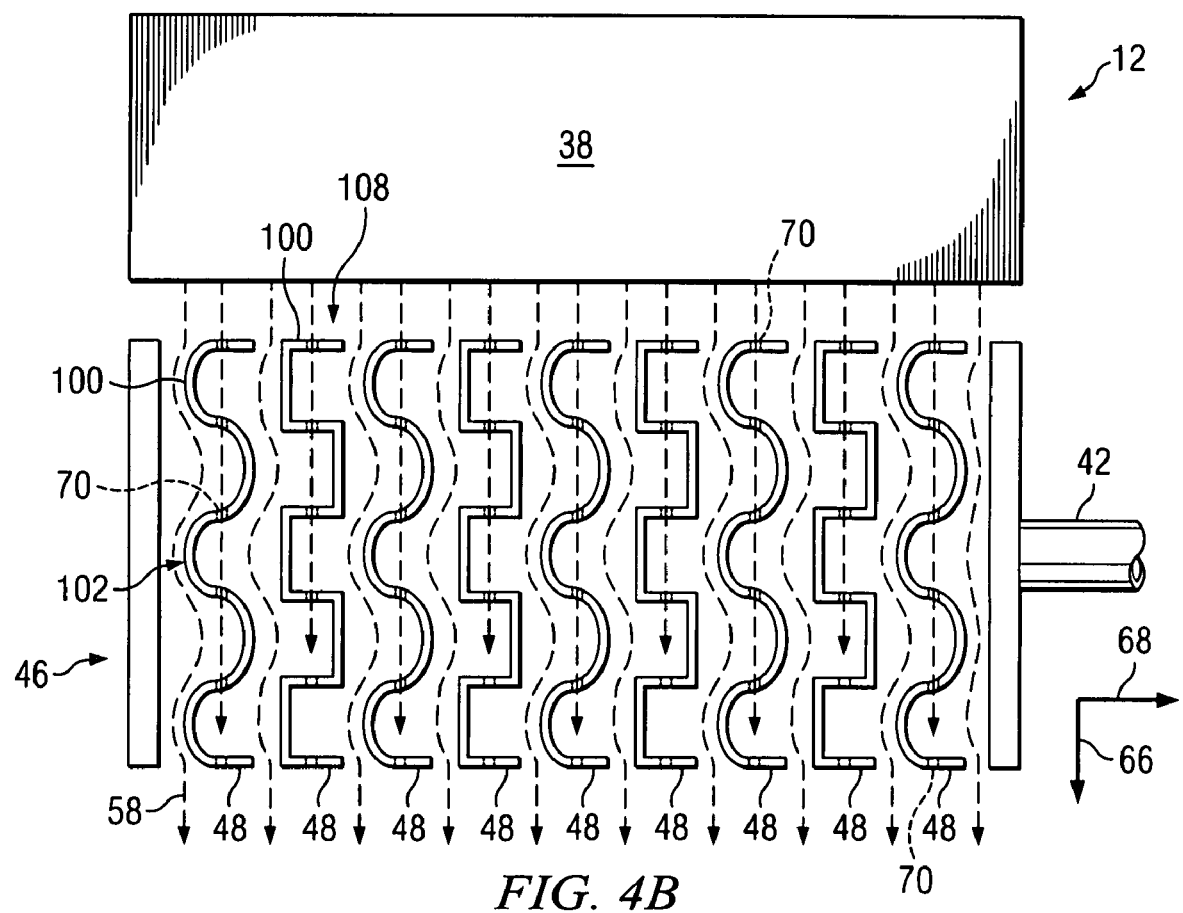

FIGS. 4A and 4B illustrate a top plan view of additional embodiments of heat dissipation system 12 for a computer device 10. In FIGS. 4A and 4B, heat dissipation system 12 comprise fan 38 and heat exchanger 46. In FIG. 4A, fins 48 of heat exchanger 46 comprise saw tooth wave configuration 104 alternating with fins 48 comprising a linear and/or planar configuration 106. In some embodiments, fins 48 having saw tooth wave configuration 104 have aperture(s) 70 disposed therein (e.g., as illustrated in FIG. 2); however, it should be understood that aperture(s) 70 may be absent from fins 48 having saw tooth wave configuration 104. Further, aperture(s) 70 may be absent from fins 48 comprising linear configuration 106. In operation, airflow 58 generally follows the configuration of the area and/or gap between each fin 48. It should be noted, however, that fins 48 may comprise a greater or fewer number and/or differently configured fins 48. In FIG. 4B, fins 48 comprise sinusoidal wave configuration 102 alternating with fins 48 comprising square wave configuration 108. In operation, airflow 58 generally follows the configuration of the area and/or gap between each fin 48. It should be noted, however, that fins 48 may comprise a greater or fewer number and/or differently configured fins 48. In FIG. 4B, fins 48 comprising sinusoidal wave configuration 102 and/or fins 48 comprising square wave configuration 108 may comprise aperture(s) 70; however, it should be understood that aperture (s) 70 may be absent from one and/or both fins 48 comprising sinusoidal wave configuration 102 and fins 48 comprising square wave configuration 108.

The embodiments of heat dissipation system 12 may be manufactured by providing heat exchanger 46 having plurality of fins 48 having at least one fin 48 comprising at least one aperture 70, and the plurality of fins being coupled to a heat pipe. The heat dissipation system may also be manufactured by providing at least one fin having a non-planar configuration. The heat dissipation system may also be manufactured by providing at least one fin having a linear configuration. The heat dissipation system may also be manufactured by providing at least one fin having a linear portion. The heat dissipation system may also be manufactured by providing the plurality of fins having at least two different non-planar configurations. The heat dissipation system may also include at least one aperture configured to abate airflow noise. The heat dissipation system may also include at least one aperture configured to enable airflow to travel in a substantially parallel flow through the at least one of the plurality of fins. The heat dissipation system may also be manufactured by providing a heat exchanger having at least one fin comprising at least one of a sinusoidal wave configuration, a saw tooth wave configuration, and a square wave configuration.

The illustrated embodiments provide heat dissipation system 112 configured to dissipate thermal emergency from computing device 10. Embodiments of heat dissipation system 112 extend the surface area to which airflow 58 contacts fins 48 of heat exchanger 46, thereby resulting in a greater rate of heat transfer away from computer device 10 while maintaining the same overall size of heat exchanger 46. Furthermore, aperture 70 of heat exchanger 70 also enables a noise abatement feature, thereby decreasing the overall noise generated in the system by the different pattern configurations 100 of fins 48.

What is claimed is:

1. A computer device heat dissipation system, comprising: a heat exchanger having a plurality of fins connected to a heat pipe, the plurality of fins including rows having a non-planar configuration that alternate and spaced apart with rows having a planar configuration, and at least one of the plurality of fins comprises at least one aperture to enable an airflow to pass therethrough.

2. The system of claim 1, wherein the non-planar configuration is a saw-tooth configuration.

3. The system of claim 1, wherein the at least one fin comprises a sinusoidal configuration.

4. The system of claim 1, wherein the at least one fin comprises a non-planar configuration having at least one planar portion.

5. The system of claim 1, wherein the at least one aperture enables airflow to travel in a substantially parallel flow through the at least one plurality of fins.

6. The system of claim 1, wherein apertures are located in a center location of the plurality of fins having a non-planar configuration to abate airflow noise.

7. The system of claim 1, wherein the plurality of fins having a non-planar configuration has a half-wavelength that includes an aperture disposed in a center location of a height of each fin to reduce noise associated with an airflow.

8. The system of claim 1, wherein the at least one fin comprises at least one of a sinusoidal wave configuration, a saw tooth wave configuration, and a square wave configuration.

9. The system of claim 1, wherein the at least one aperture is disposed in a medial position relative to a height of the at least one fin.

10. A method of manufacturing a computer device heat dissipation system, comprising:
    providing a heat exchanger having a plurality of fins in a computer device, at least one of the plurality of fins comprising at least one aperture to enable an airflow to pass therethrough; and
    configuring the plurality of fins having two different alternating planar and non-planar configurations that are spaced apart.

11. The method of claim 10, further comprising configuring the at least one fin having a non-planar configuration of a saw-tooth.

12. The method of claim 10, further comprising configuring the at least one fin having a sinusoidal configuration.

13. The method of claim 10, further comprising configuring the at least one fin having a non-planar configuration having at least one planar portion.

14. The method of claim 10, wherein the plurality of fins alternate between a square wave configuration and a sinusoidal configuration.

15. The method of claim 10, further comprising configuring the at least one aperture in a central location of a fin to abate airflow noise.

16. The method of claim 10, further comprising providing the plurality of fins having a half-wavelength that includes an aperture disposed in a center location of a height of each half-wavelength to reduce noise associated with an airflow.

17. The method of claim 10, further comprising providing the at least one fin having at least one of a sinusoidal wave configuration, a saw tooth wave configuration, and a square wave configuration.

18. A computer device heat dissipation system, comprising:
   at least one fan configured to generate an airflow across a plurality of fins of a heat exchanger, the plurality of fins having an alternating arrangement of fin configuration patterns, wherein the alternating arrangement of fin configuration patterns comprise a planar conflagration pattern alternating and spaced apart with a non-planar configuration pattern.

19. The system of claim 18, wherein the non-planar configuration is a saw-tooth configuration.

20. The system of claim 18, wherein the plurality of fins having the non-planar configuration have a half-wavelength that includes an aperture disposed in a center location of a height of each half-wavelength to reduce noise associated with an airflow.

* * * * *

UNITED STATES PATENT AND TRADEMARK OFFICE
CERTIFICATE OF CORRECTION

PATENT NO. : 7,548,428 B2
APPLICATION NO. : 11/881538
DATED : June 16, 2009
INVENTOR(S) : Jeffrey A. Lev et al.

It is certified that error appears in the above-identified patent and that said Letters Patent is hereby corrected as shown below:

In column 6, line 2, in Claim 18, delete "conflagration" and insert -- configuration --, therefor.

Signed and Sealed this

Sixteenth Day of March, 2010

David J. Kappos
*Director of the United States Patent and Trademark Office*